(12) United States Patent
Sobue

(10) Patent No.: US 7,719,559 B2
(45) Date of Patent: May 18, 2010

(54) IMAGE FORMING APPARATUS, OPTICAL SCANNING APPARATUS, AND AUTO LIGHT POWER CONTROL METHOD

(75) Inventor: Fumitaka Sobue, Toride (JP)

(73) Assignee: Canon Kabushiki Kaisha (JP)

( * ) Notice: Subject to any disclaimer, the term of this patent is extended or adjusted under 35 U.S.C. 154(b) by 35 days.

(21) Appl. No.: 11/696,175

(22) Filed: Apr. 3, 2007

(65) Prior Publication Data

US 2007/0242128 A1 Oct. 18, 2007

(30) Foreign Application Priority Data

Apr. 12, 2006 (JP) .............................. 2006-110104

(51) Int. Cl.
*B41J 2/385* (2006.01)
*B41J 2/435* (2006.01)
*B41J 2/45* (2006.01)
*G02B 26/08* (2006.01)

(52) U.S. Cl. ................. 347/236; 347/130; 347/238; 347/246; 359/204.2

(58) Field of Classification Search ................. None
See application file for complete search history.

(56) References Cited

U.S. PATENT DOCUMENTS

| | | | |
|---|---|---|---|
| 4,600,837 A | 7/1986 | DiStefano et al. | |
| 5,627,670 A | 5/1997 | Minoura et al. | |
| 5,812,299 A | 9/1998 | Minakuchi et al. | |
| 5,892,219 A * | 4/1999 | Minakuchi et al. | 250/205 |
| 6,243,123 B1 | 6/2001 | Tanimoto et al. | |
| 6,476,370 B1 * | 11/2002 | Suzuki et al. | 250/208.1 |
| 6,483,529 B1 * | 11/2002 | Ito et al. | 347/235 |
| 6,646,668 B2 * | 11/2003 | Tanimoto et al. | 347/234 |
| 6,844,892 B2 | 1/2005 | Iima et al. | |

(Continued)

FOREIGN PATENT DOCUMENTS

EP 0 827 326 A2 3/1998

(Continued)

OTHER PUBLICATIONS

Search Report issued in the corresponding European application No. 07105750.9-2304 mailed on Aug. 14, 2007.

(Continued)

*Primary Examiner*—Matthew Luu
*Assistant Examiner*—Kendrick X Liu
(74) *Attorney, Agent, or Firm*—Rossi, Kimms & McDowell LLP

(57) ABSTRACT

An image forming apparatus includes light source having multiple light-emitting portions, rotating polygonal mirror which deflects a beam that is emitted from light source, and photosensitive member which is exposed by beams in an image period that is included in one scanning cycle of the beam. One scanning cycle of the beam includes an image period and a non-image period. This apparatus includes selection unit which selects one or more light-emitting portions to be used in image period from among multiple light-emitting portions, and driving unit which drives selected light-emitting portions to emit a beam in a non-image period that is immediately before image period. This apparatus further includes control unit which executes auto light power control for one or more light-emitting portions to be used in image period according to light power of beams detected by beam detection unit.

8 Claims, 16 Drawing Sheets

U.S. PATENT DOCUMENTS

| | | |
|---|---|---|
| 2004/0141051 A1 | 7/2004 | Tsuruya et al. |
| 2004/0145644 A1* | 7/2004 | Makino .................. 347/233 |
| 2006/0285186 A1* | 12/2006 | Ishida et al. ............. 359/204 |
| 2008/0018727 A1* | 1/2008 | Ishikawa et al. .......... 347/224 |

FOREIGN PATENT DOCUMENTS

| | | |
|---|---|---|
| JP | 63-50809 A | 3/1988 |
| JP | 3-64729 A | 3/1991 |
| JP | 3-255295 A | 11/1991 |
| JP | 05-096781 A | 4/1993 |
| JP | 5-208523 A | 8/1993 |
| JP | 7-012709 A | 1/1995 |
| JP | 9-159948 A | 6/1997 |
| JP | 3255295 B2 | 11/2001 |
| JP | 2005-234510 A | 9/2005 |
| JP | 2006035703 A * | 2/2006 |

OTHER PUBLICATIONS

Extened search report, dated Mar. 6, 2008, issued in corresponding European patent application No. 07007263.2-2304.

Related co-pending U.S. Appl. No. 11/696,173; Fumitaka Sobue; "Image Forming Apparatus And Control Method Thereof"; filed Apr. 3, 2007; Spec. pp. 1-33; Figs. 1-15.

* cited by examiner

F I G. 5
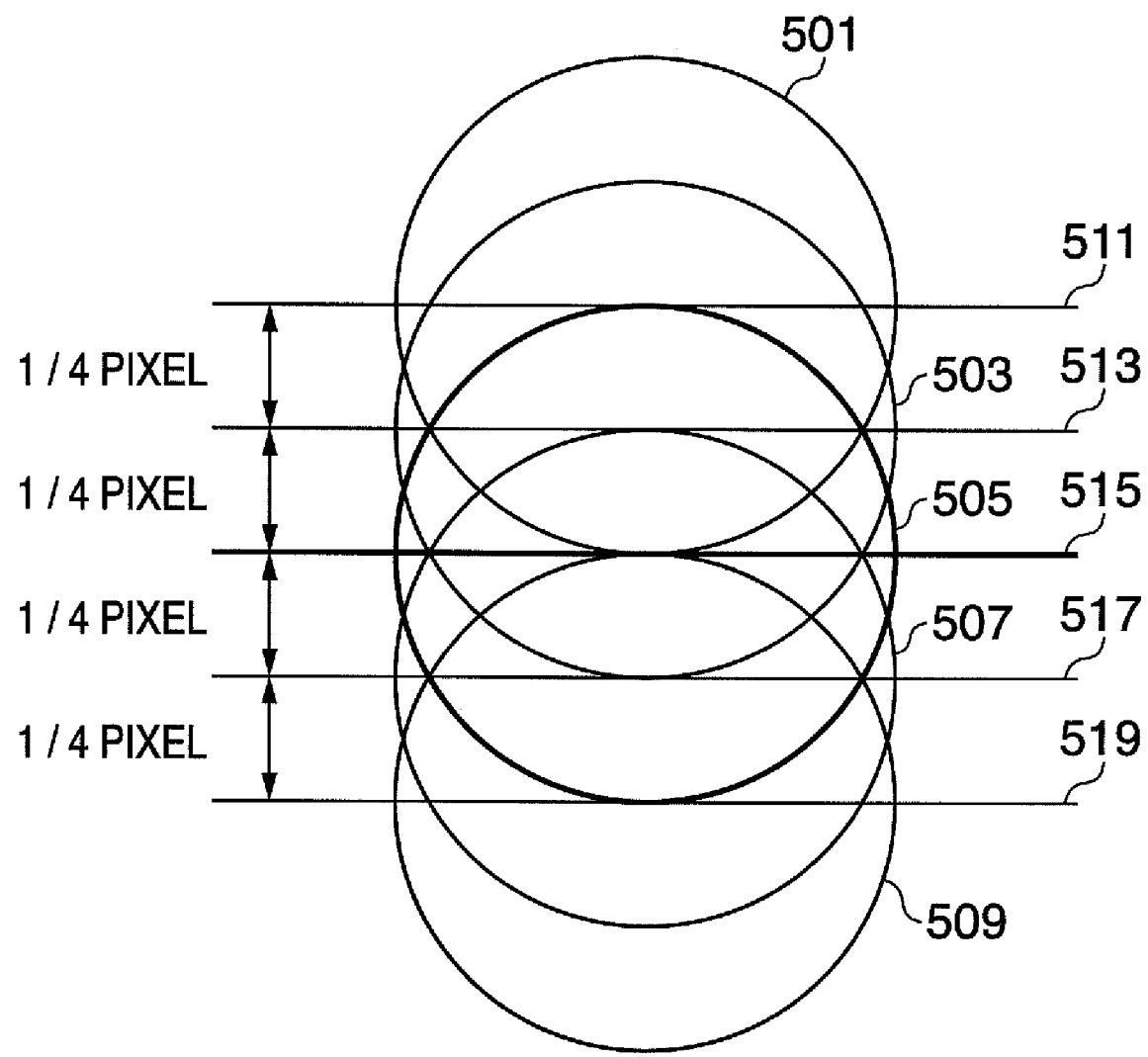

IMAGE FORMING APPARATUS, OPTICAL SCANNING APPARATUS, AND AUTO LIGHT POWER CONTROL METHOD

BACKGROUND OF THE INVENTION

1. Field of the Invention

The present invention relates to an image forming apparatus that performs light exposure using a light source that has a plurality of light-emitting portions.

2. Description of the Related Art

Conventionally, semiconductor lasers that can perform direct intensity modulation by drive current have been employed in optical scanning apparatuses that are mounted in image forming apparatuses. It is known that there is a significant difference with respect to the drive current/light output characteristics between each light emitting device. Also, it is known that even for the same light emitting device, these characteristics vary according to the environmental temperature or the device temperature. Therefore, APC (auto power control) is employed. In APC, the light power of a semiconductor laser is monitored and light power control is carried out so that the light power keeps a target value.

A multi-beam optical system is also known. The system can form a plurality of lines with one scan by using a plurality of light sources. A method has been proposed that performs light power control of each light source in a multi-beam optical system by causing all the light sources provided in the multi-beam optical system to emit light in a sequential order in a non-image period within one scanning cycle (Japanese Patent Application Laid-open No. 7-12709).

A method has also been proposed that feeds a bias current of a level that does not emit light to a laser in order to improve the responsiveness of the laser (Japanese Patent No. 3255295). In order to decide this bias current, light power control is required for each light source.

The number of light sources used in multi-beam optical systems tends to increase as the result of demands for faster print speeds and higher image quality in recent years. For the same reasons, the number of mirror planes of rotating polygonal mirrors is also increasing and the rotating speed is being sped up. As a result, a non-image period included in a single scanning cycle is becoming shorter than heretofore.

On the other hand, it is necessary to execute not only APC for adjusting the light power when the light is on but also APC for adjusting the bias current for each light source in the non-image period. However, since a period of from several microseconds to several tens of microseconds is generally required as the execution time for these APCs, the shorter the non-image period becomes, the more difficult it is to accurately execute the APC. In particular, it is becoming difficult to execute APC in a single non-image period for all light sources comprised by an optical system.

SUMMARY OF THE INVENTION

A feature of the present invention is to solve at least one problem among the problems described above and other problems. In this connection, other problems will be understood upon reading through this entire specification.

The present invention can be favorably realized by, for example, an image forming apparatus comprising a light source having a plurality of light-emitting portions, a rotating polygonal mirror which deflects a beam that is emitted from the light source, and a photosensitive member which is exposed by a beam in an image period which is included in one scanning cycle of the beam. One scanning cycle of a beam includes an image period and a non-image period. The present apparatus includes a selection unit which selects one or more light-emitting portions to be used in an image period from among a plurality of light-emitting portions, and a driving unit which drives the selected light-emitting portion(s) so as to emit a beam in a non-image period that is immediately before the image period. Further, the present apparatus includes a control unit which executes auto light power control for one or more light-emitting portions to be used in an image period in accordance with the light power of a beam which is detected by a detection unit.

Further features of the present invention will be apparent from the following description of exemplary embodiments with reference to the attached drawings.

BRIEF DESCRIPTION OF THE DRAWINGS

FIG. 5 is a view which illustrates the relation between spots and each light-emitting portion of a semiconductor laser according to the embodiments;

DESCRIPTION OF THE EMBODIMENTS

Embodiments of the present invention are described hereunder. Naturally, the individual embodiments described hereunder are useful in understanding various concepts of the present invention such as a superordinate concept, an intermediate concept, and a subordinate concept. Note that the technical scope of the present invention is defined by the patent claims, and is not limited by the individual embodiments described hereunder.

First Embodiment

Figure 1:
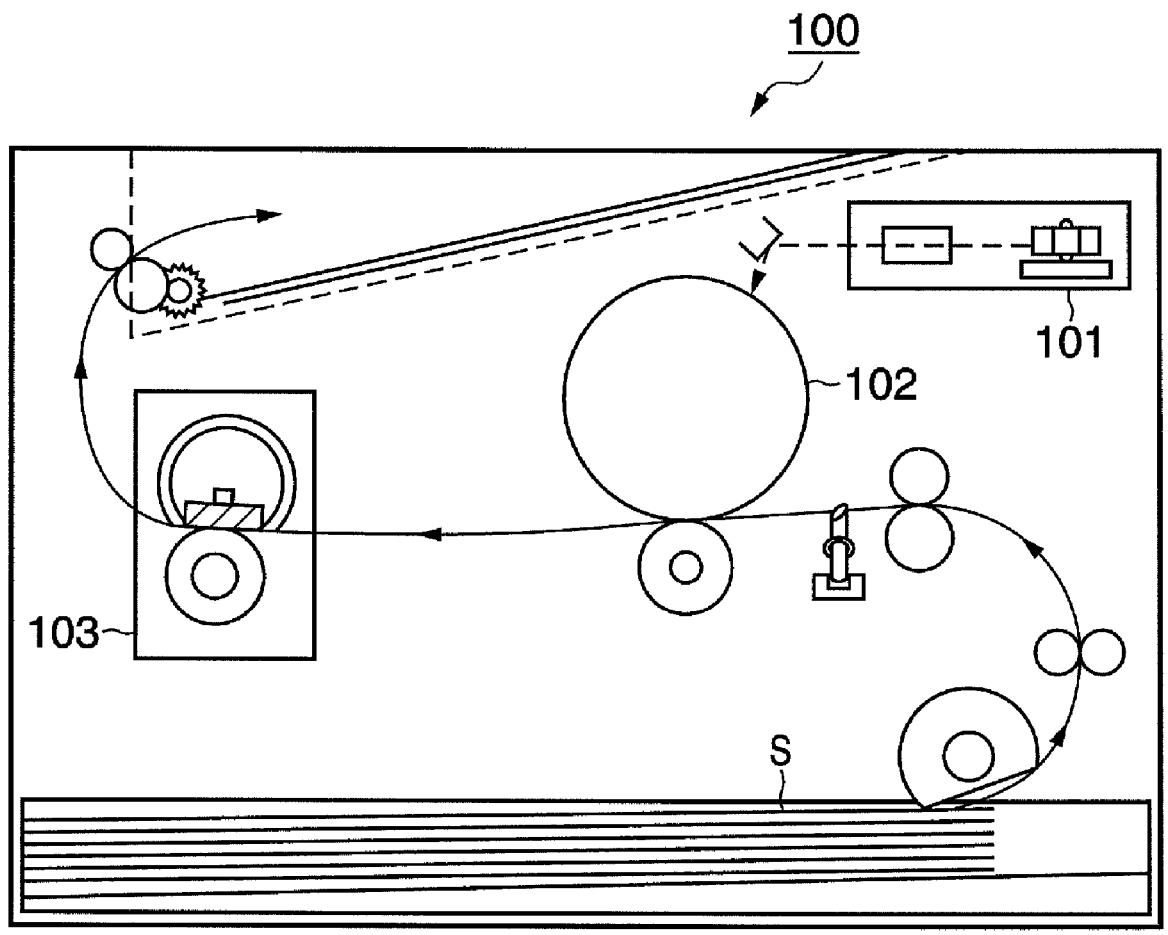
FIG. 1 is a schematic cross section of an image forming apparatus according to the embodiments.

FIG. 1 is a schematic cross section of an image forming apparatus according to the embodiments. An image forming apparatus 100 is an apparatus which forms monocolor or multi color images. For example, the image forming apparatus 100 is implemented as a printing apparatus, an image outputting apparatus, a printer, a copier, a multifunction peripheral or a facsimile machine.

An optical scanning apparatus (exposure apparatus) 101 is an apparatus which scans a light beam onto a uniformly charged and drum-like photosensitive member 102. Thereby, an electrostatic latent image corresponding to an image signal is formed on the photosensitive member 102. The electrostatic latent image is converted into a developer (for example, toner) image by a developing apparatus. A fixing apparatus 103 fixes the developer image to a recording medium S onto which the developer image was transferred from the photosensitive member 102. The recording medium S may also be referred to as a paper, a sheet, a transfer material, printing material, printing medium or the like.

Figure 2:
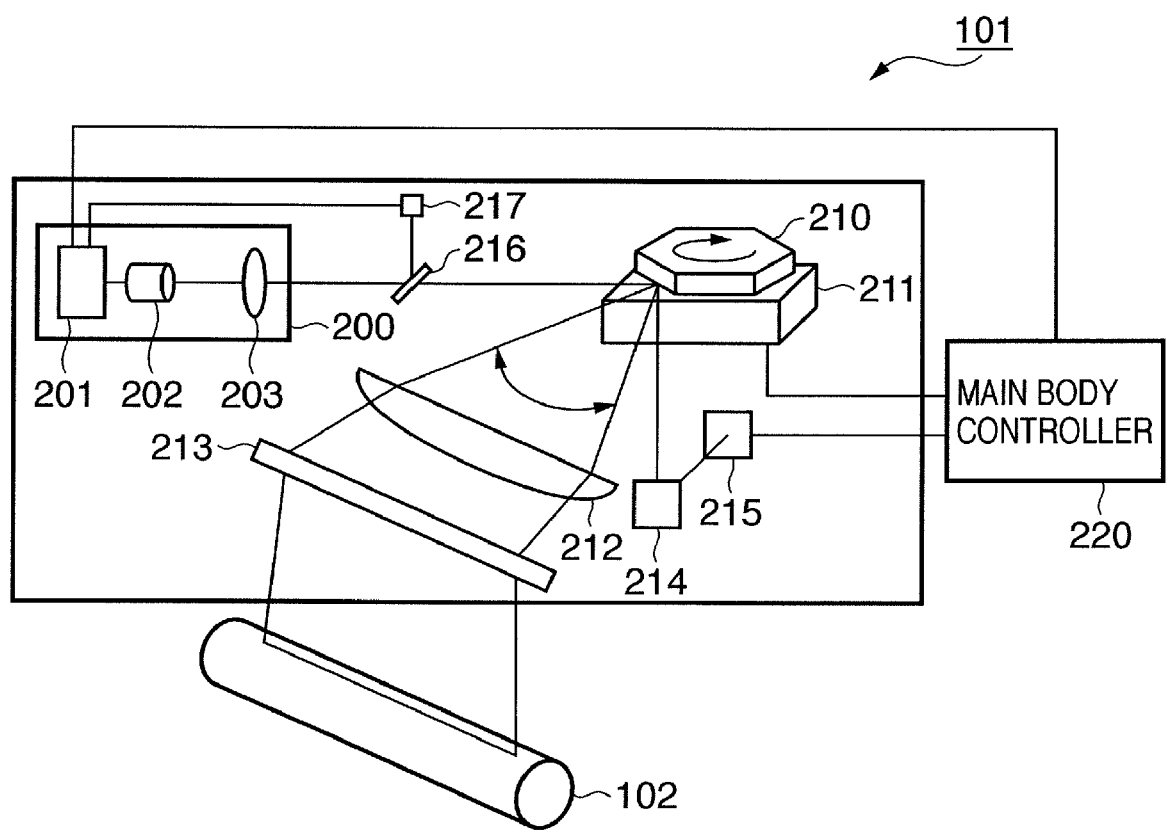
FIG. 2 is a view which illustrates one example of an exposure apparatus according to the embodiments.

FIG. 2 is a view which illustrates one example of the optical scanning apparatus according to this embodiment. The optical scanning apparatus 101 has a laser unit 200, a rotating polygonal mirror (polygonal mirror) 210, a polygonal mirror motor 211, an fθ lens 212, a returning mirror 213, a reflecting mirror 214 and a beam detecting sensor 215. The optical scanning apparatus 101 also has a half mirror 216 and a light receiving device 217 for detecting the light power of a beam. The light receiving device 217 is, for example, a sensor such as a photodiode.

The laser unit 200 has a laser drive unit 201, a semiconductor laser 202 and a collimator lens 203. The semiconductor laser 202 is a light source package that emits laser light when it is driven by the laser drive unit 201. The laser light may also be referred to as a "beam". The collimator lens 203 is an optical component which converts a laser light that is emitted from the semiconductor laser 202 into a predetermined beam diameter. The laser drive unit 201 is controlled by a main body controller 220. The main body controller 220 includes a CPU, a ROM and a RAM, and executes various controls relating to the image forming process.

The polygonal mirror 210 is a rotating polygonal mirror which deflects a laser light of a predetermined beam diameter while rotating. The polygonal mirror 210 comprises a plurality of mirror planes (these may also be referred to as "scanning mirror planes" or "reflecting planes"). The polygonal mirror motor 211 is a motor for rotating the polygonal mirror 210. The fθ lens 212 is an optical component for focusing a laser light that is reflected by the polygonal mirror 210. The returning mirror 213 is an optical component for guiding a laser light that passes through the fθ lens 212 onto the plane of the photosensitive member 102.

The reflecting mirror 214 is an optical component for guiding a laser light to the beam detecting sensor 215. The beam detecting (BD) sensor 215 detects a laser light that is reflected by the reflecting mirror 214, and outputs a beam detection signal (BD signal) to the main body controller 220. A beam detection signal is output for each line in the main scanning direction.

The main body controller 220 detects a cycle in which a beam detection signal is output, and controls the rotation of the polygonal mirror by outputting acceleration signals or deceleration signals to the polygonal mirror motor 211 so that that cycle becomes a predetermined cycle. The polygonal mirror motor 211 drives the polygonal mirror 210 based on the control of the main body controller 220.

One portion of a laser light that is emitted from the semiconductor laser 202 is reflected by the half mirror 216 and received by the light receiving device 217. The light receiving device 217 outputs a current in accordance with the light power of the received laser light. That is, the current and the light power correlate. The laser drive unit 201 controls the drive current of the laser 202 in accordance with the value of this current to achieve a predetermined light power. This is the APC. In this connection, APC may also be referred to as "auto light power control".

Figure 3:
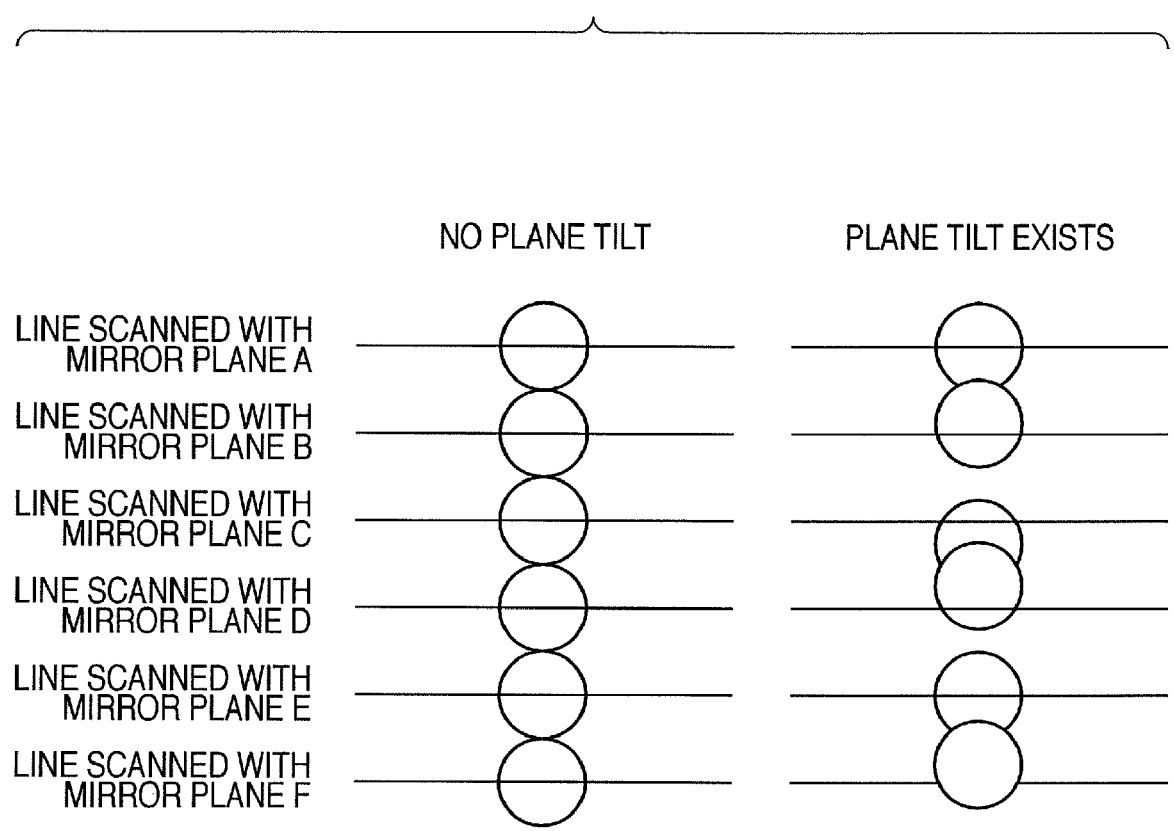
FIG. 3 is a view which illustrates the irradiated positions (spot positions) of laser lights in a case where there is no plane tilt, and the irradiated positions of laser lights in a case where there is a plane tilt.

FIG. 3 is a view which illustrates irradiated positions (spot positions) of laser lights in a case where there is no plane tilt, and irradiated positions of laser lights in a case where there is a plane tilt. A plane tilt is an inclination in the mirror plane with respect to the rotational axis of the polygonal mirror. More specifically, the term "plane tilt" refers to a state in which a line of intersection between a certain mirror plane and a plane including the rotational axis is not parallel to the rotational axis. The plane tilt may be called "plane tilt shift" or "plane tilt error".

In the example shown in FIG. 3, it is assumed that the polygonal mirror has six mirror planes (A to F). Each straight line in the figure represents the ideal irradiated position of each mirror plane. As will be understood from the figure, at ideal laser irradiated positions of the polygonal mirror at which a plane tilt does not exist or at which a plane tilt can be ignored, the intervals between lines that are formed by each mirror plane are constant.

In contrast, at general laser irradiated positions of the polygonal mirror at which a plane tilt exists or at which a plane tilt cannot be ignored, the intervals between lines (scanning lines) that are formed by each mirror plane are not constant. Although according to the figure the mirror plane A and the mirror plane E are not plane-tilted with respect to the rotational axis of the polygonal mirror, it is found that the other mirror planes all incline away from the rotational axis. Naturally, the interval (subscanning pitch interval) between each line in the subscanning direction will not be uniform. Hence, it is necessary to reduce the pitch nonuniformity by selecting a light-emitting portion(s) that is suitable for the current mirror plane that is to be used to deflect a beam from the light source from among the plurality of mirror planes.

Figure 4:
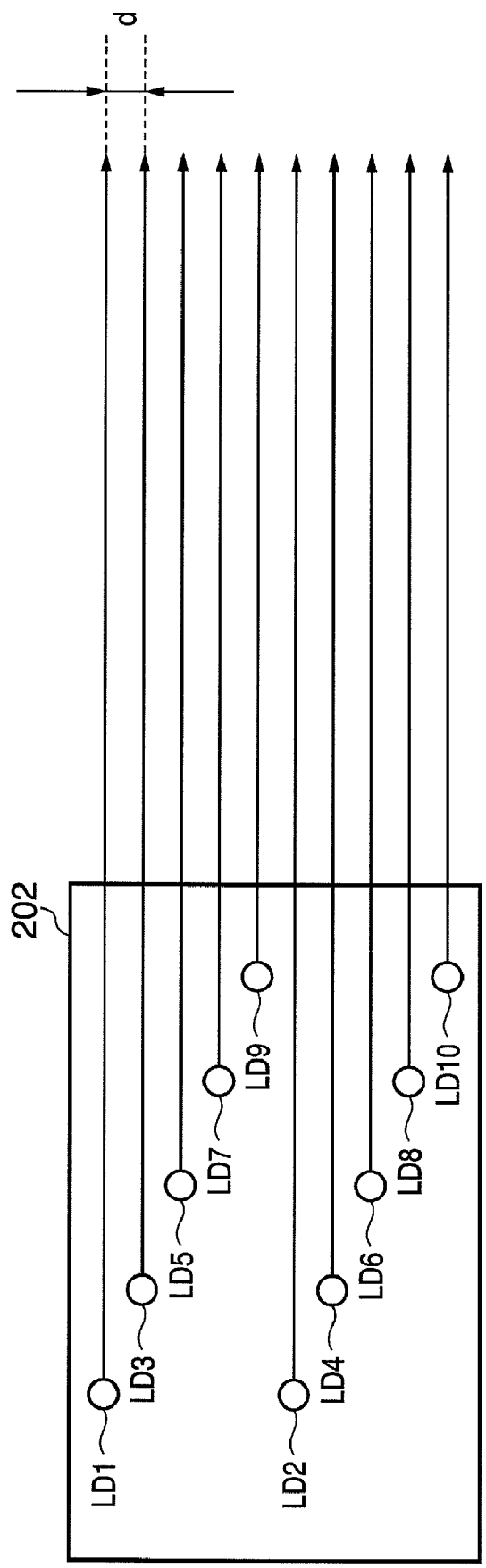
FIG. 4 is a view which illustrates one example of a semiconductor laser according to the embodiments.

FIG. 4 is a view which illustrates one example of a semiconductor laser according to this embodiment. The semiconductor laser 202 according to the present embodiment has a plurality of light-emitting portions LD1 to LD10. Naturally, each light-emitting portion is also a light source and a single laser device. The respective beams emitted from the plurality of light-emitting portions form respective spots on the photosensitive member 102. According to the present embodiment, the light-emitting portions are disposed in the semiconductor laser 202 such that an interval "d" between the spots of the light-emitting portions is narrower than the resolution in the subscanning direction of the image forming apparatus 100.

According to the present embodiment, two lines are formed by two light-emitting portions to accelerate the image forming speed. For example, LD1 and LD2 constitute a pair to form two adjoining lines. Likewise, LD3 and LD4 constitute a pair, LD5 and LD6 constitute a pair, LD7 and LD8 constitute a pair, and LD9 and LD10 constitute a pair.

FIG. 5 is a view which illustrates the relation between spots and each light-emitting portion of the semiconductor laser according to this embodiment. Spots 501 to 509 correspond to the light-emitting portions LD1 to LD9, respectively. Similarly, straight lines 511 to 519 represent lines that are formed by the light-emitting portions LD1 to LD9, respectively. As will be understood from the figure, the intervals "d" between each spot are ¼ of a pixel, respectively. It is therefore possible according to the present embodiment to reduce the amount of plane tilt according to the following range: +½ pixel, +¼ pixel, −¼ pixel and −½ pixel.

For example, let us assume a case in which the amount of plane tilt of the mirror plane A is ±0 pixels (the upward direction is taken as the + direction). In this case, with respect to the mirror plane A, it is sufficient that the laser drive unit 201 causes the light-emitting portions LD1 and LD2 to emit laser lights. If the amount of plane tilt of the mirror plane B is +¼ pixel, the amount of plane tilt can be reduced if the laser drive unit 201 causes laser lights to be emitted from the light-emitting portions LD7 and LD8. The amount of plane tilt can also be reduced for the other mirror planes by using favorable pairs of light-emitting portions in a similar manner.

By selecting light-emitting portions that are suitable for reducing the amount of plane tilt in this manner, it is possible to form an image in which the pitch of lines in the subscanning direction is constant. In this connection, since the number of light-emitting portions with respect to one line is five according to the present embodiment, pitch nonuniformity can be corrected within the range of ±½ pixel. By further increasing the number of lasers, the correction accuracy can be improved further. The correction range can also be enlarged.

Figure 6:
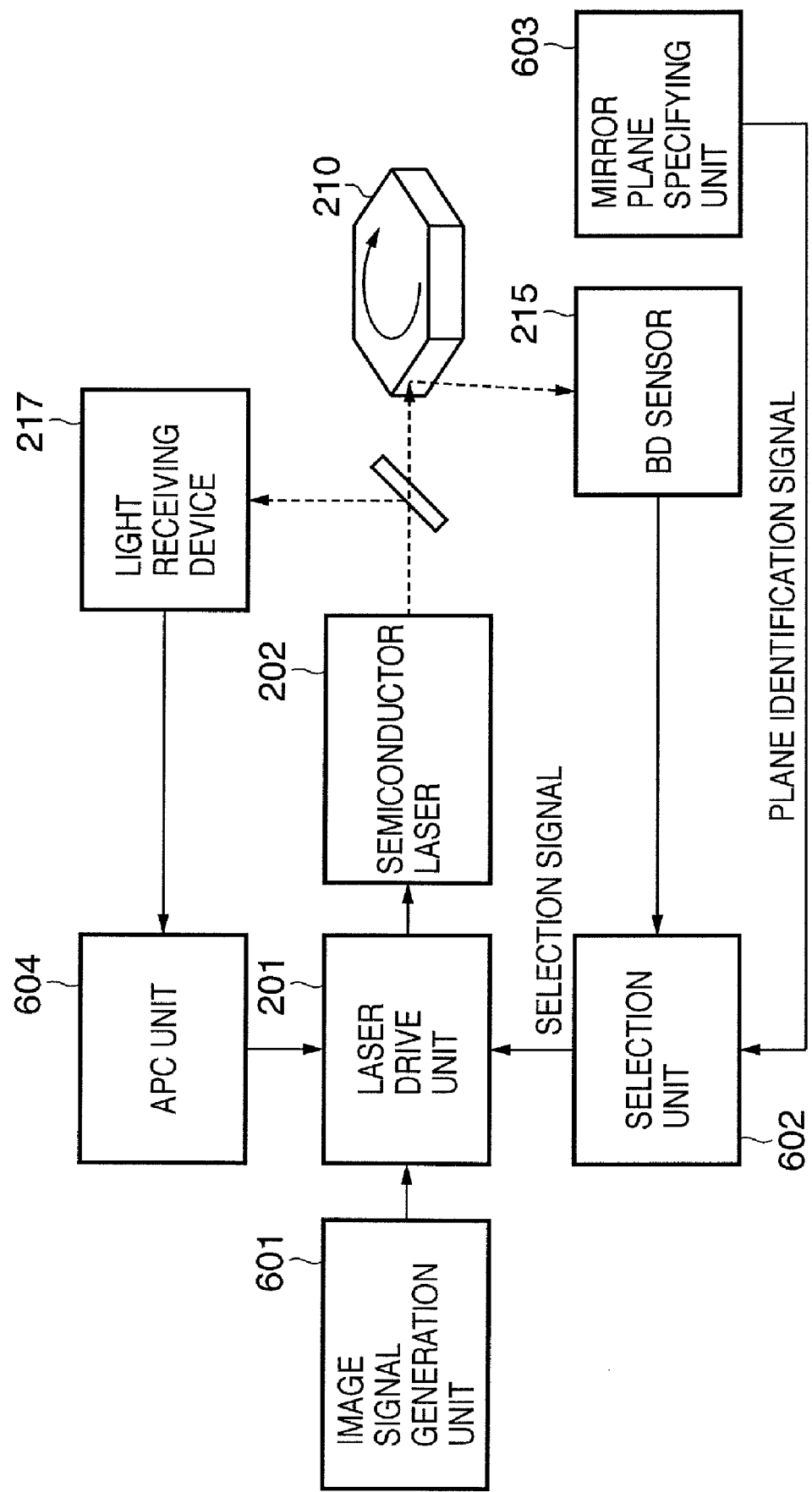
FIG. 6 is a view for describing a control mechanism according to the embodiments.

FIG. 6 is a view for describing a control mechanism according to this embodiment. An image signal generation unit 601 is included in the main body controller 220, and generates an image signal that corresponds to image data. A selection unit 602 selects light-emitting portions which it is preferable to cause to emit light, respectively, at each timing in a scanning cycle.

For example, the selection unit 602 selects a specific light-emitting portion (light-emitting portion for BD) for determining the timing as the starting point of image formation in a BD period which is located at the initial stage of a scanning cycle. In this connection, a single scanning cycle includes a BD period, an image period, a non-image period, an OFF period and the like. The BD period and the OFF period may also be considered as parts of the non-image period.

The selection unit 602 selects one or more light-emitting portions that are suitable for each mirror plane in the image period. In this connection, light-emitting portions to be used in an image period are light-emitting portions for which APC is executed in a preceding non-image period. Naturally, a preceding non-image period is preferably the immediately preceding light emitting period. Further, in order to execute APC in a non-image period, the selection unit 602 selects the light-emitting portions to be used in the subsequent image period.

A mirror plane specifying unit 603 specifies the current mirror plane. More specifically, the mirror plane specifying unit 603 is adapted to output identification information (for example, a plane identification signal) that differs for each mirror plane. For example, a magnet is attached to the lower part of one mirror plane (for example, mirror plane A) and a Hall device is also attached at a position which is on the lower part of the polygonal mirror 210 and which corresponds to the mirror plane at which a laser light will be irradiated. More specifically, a detection signal is output from the Hall device only when the mirror plane A reflects a laser light. Since the relative positional relationship between the mirror plane A and the other mirror planes is fixed, as long as it can detect just the mirror plane A, the mirror plane specifying unit 603 can specify the current mirror plane in accordance with the rotational cycle of the polygonal mirror 210.

The selection unit 602 selects a light-emitting portion(s) to be used in an image period in accordance with this plane identification signal and outputs a selection signal for driving the selected light-emitting portion(s) to the laser drive unit 201. In this connection, the selection unit 602 may read out the plane identification signal and use it as an address to read out the corresponding selection signal from a memory. The relation (table) between the plane identification signals and the selection signals is, for example, set at the time of factory shipment. More specifically, at the factory that manufactures the image forming apparatus 100, the amount of plane tilt of each mirror plane of the polygonal mirror 210 is measured, and selection signals (light-emitting portions) that are effective for reducing the measured amount of plane tilt are determined. That is, light-emitting portions are determined that are suitable for decreasing position errors of spots that are attributable to the amount of plane tilt of the mirror plane. The correlation between each plane identification signal and each selection signal is then stored in the memory.

The APC unit 604 is a control unit that executes auto light power control for each light-emitting portion in accordance with the light power of beams that are detected by the light receiving device 217. As described above, the auto light power control comprises a first auto light power control for setting the light power of a beam that is emitted from a light-emitting portion to the target light power, and a second auto light power control for determining the bias current for the light-emitting portion.

Figure 7:
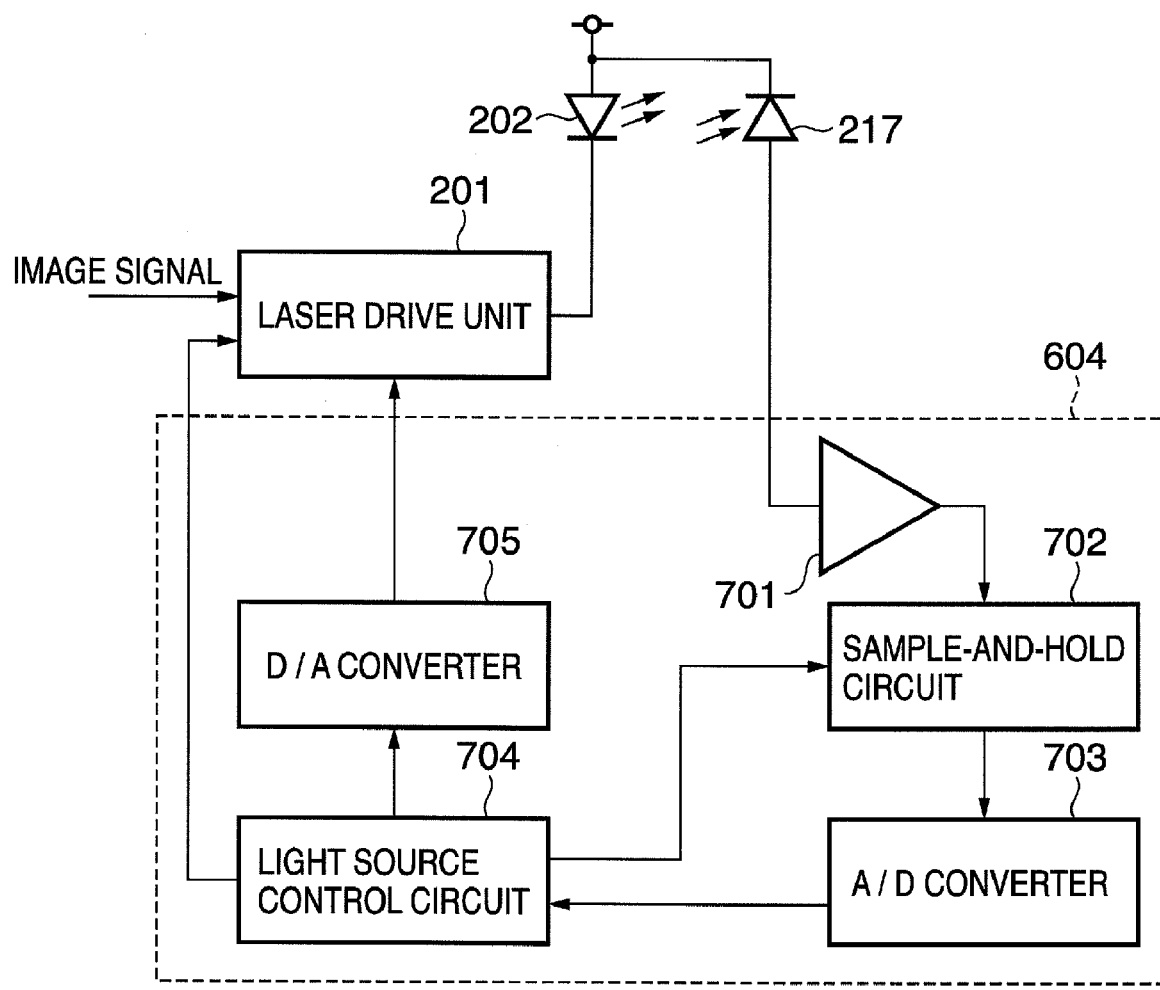
FIG. 7 is a view which illustrates one example of an APC unit according to the embodiments.

FIG. 7 is a view which illustrates one example of an APC unit according to this embodiment. An amplifier 701 is a device for amplifying a detection signal that is output from the light receiving device 217. Naturally, the size of the detection signal correlates to the light power. A sample-and-hold circuit 702 is a circuit that samples and holds an amplified detection signal. An A/D converter 703 is a circuit that converts the value of a detection signal that is output from the sample-and-hold circuit 702 into a digital signal.

A light source control circuit 704 controls the value of current flowing to the laser drive unit 201 based on whether or not the value of a detection signal (light power) is a target value. For example, for each light-emitting portion, the light source control circuit 704 may store the value of the bias current and the value of the drive current at the time of image formation in the memory. In this case, the light source control circuit 704 reads out a favorable current value in accordance with a selection signal to set the laser drive unit 201. A D/A converter 705 is a circuit which converts a current value that is output from the light source control circuit 704 into an analog value.

Figure 8:
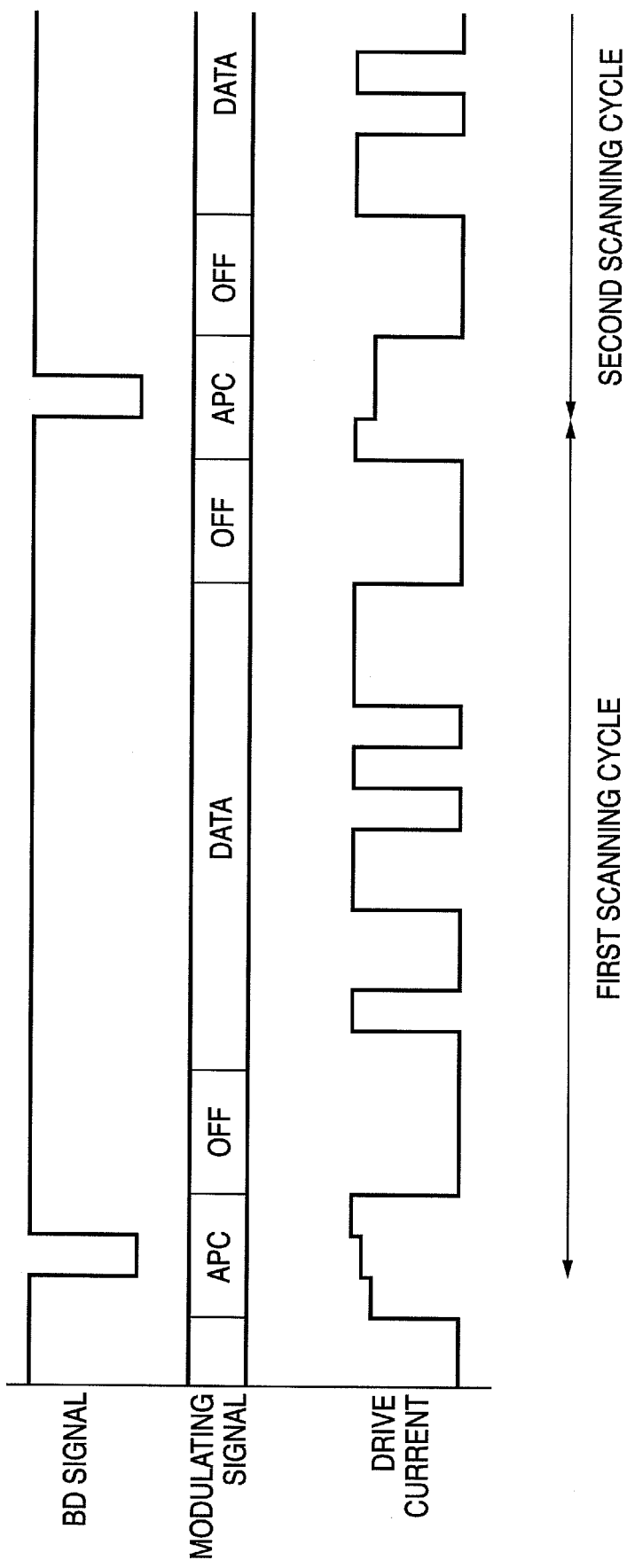
FIG. 8 is a basic APC timing chart.

FIG. 8 is a basic APC timing chart. Hereunder, to facilitate the description, a case is described in which a light-emitting portion for BD is subjected to APC in a BD period.

The light source control circuit 704 executes APC until the light power of the semiconductor laser 202 reaches a target value. According to FIG. 8, the light source control circuit 704 increases the drive current by two steps in the first scanning cycle. In this case, since the light power exceeds the target value, the light source control circuit 704 lowers the drive current by one step in the second scanning cycle. In this manner, the light power of each light-emitting portion is maintained at the target value. When setting the bias current, the light source control circuit 704 increases the drive current one step at a time, and when the light power is detected, it decreases the drive current by only one step. Thereby, the bias current is determined.

Figure 9:
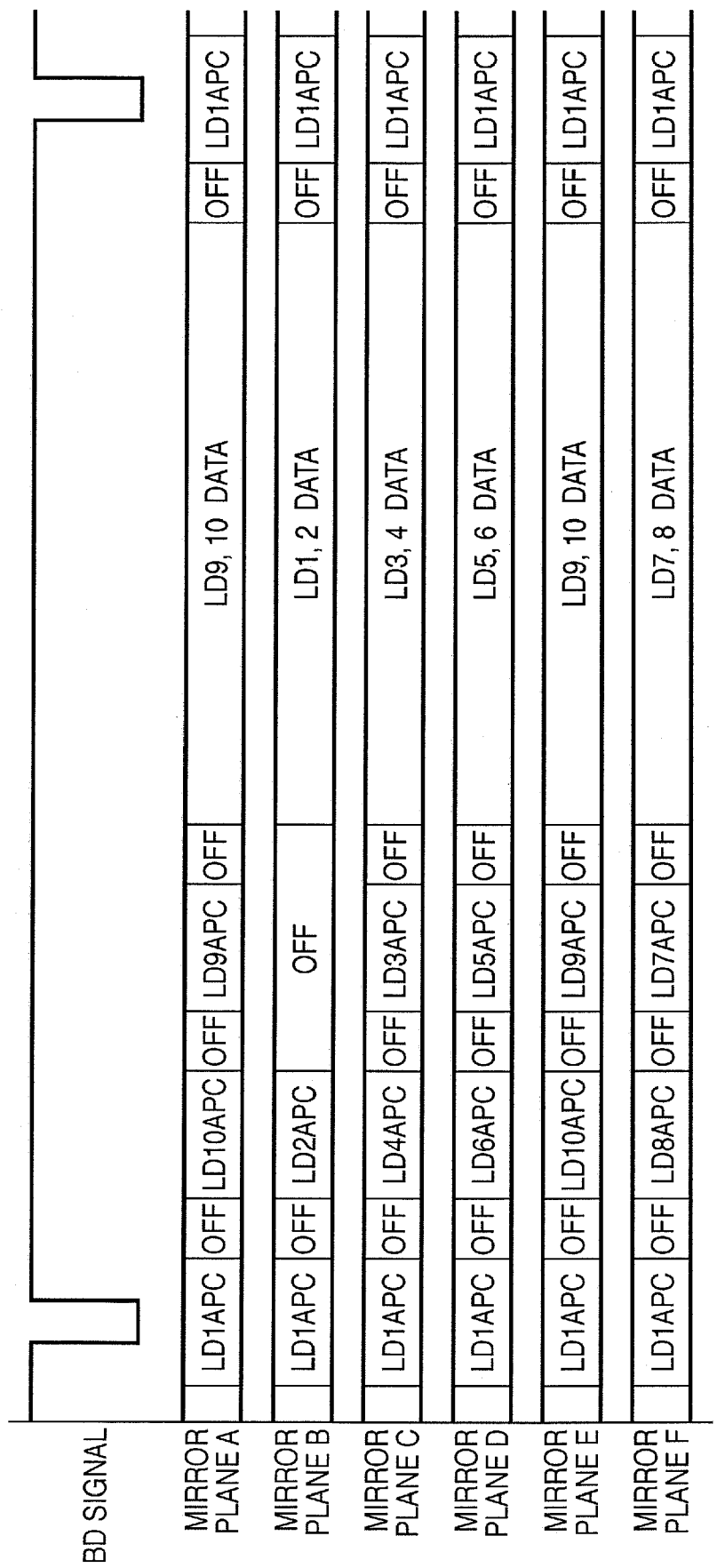
FIG. 9 is an exemplary APC timing chart according to the embodiments.

FIG. 9 is an exemplary APC timing chart according to this embodiment. In FIG. 9, a period that is described as "LD1

APC" is a period in which APC is executed for the light-emitting portion LD1. The same applies for the periods described as "LD2 APC" to "LD10 APC". A period described as "OFF" is a period in which all of the light-emitting portions are switched off. A period described as "LD1, 2 DATA" is a period in which the light-emitting portion LD1 and the light-emitting portion LD2 are caused to emit light in accordance with an image signal. The same applies for the periods described as "LD3, 4 DATA" to "LD9, 10 DATA".

In order to alleviate the influence of a plane tilt, the light-emitting portions LD9 and LD10 are used for the mirror plane A. The respective light powers of the light-emitting portions LD9 and LD10 that are used for image formation directly influence the density of the image. Therefore, these light powers must be precisely adjusted to a predetermined light power. Further, the relation between the drive current and the light power adjusted by APC varies over time due to the influence of heat and the like. It is thus preferable to adjust the light power of each light-emitting portion immediately prior to image formation. More specifically, when performing image formation with the mirror plane A, APC is executed for the light-emitting portions LD9 and LD10 in the immediately preceding non-image period.

For the mirror plane B, although LD1 and LD2 are used in the image period, since APC is already completed for LD1 in the BD period, APC is only executed for LD2 in the immediately preceding non-image period. It is thereby possible to reduce the power consumption and extend the life of LD1. A detailed description in this regard is provided in the third embodiment.

Figure 10:
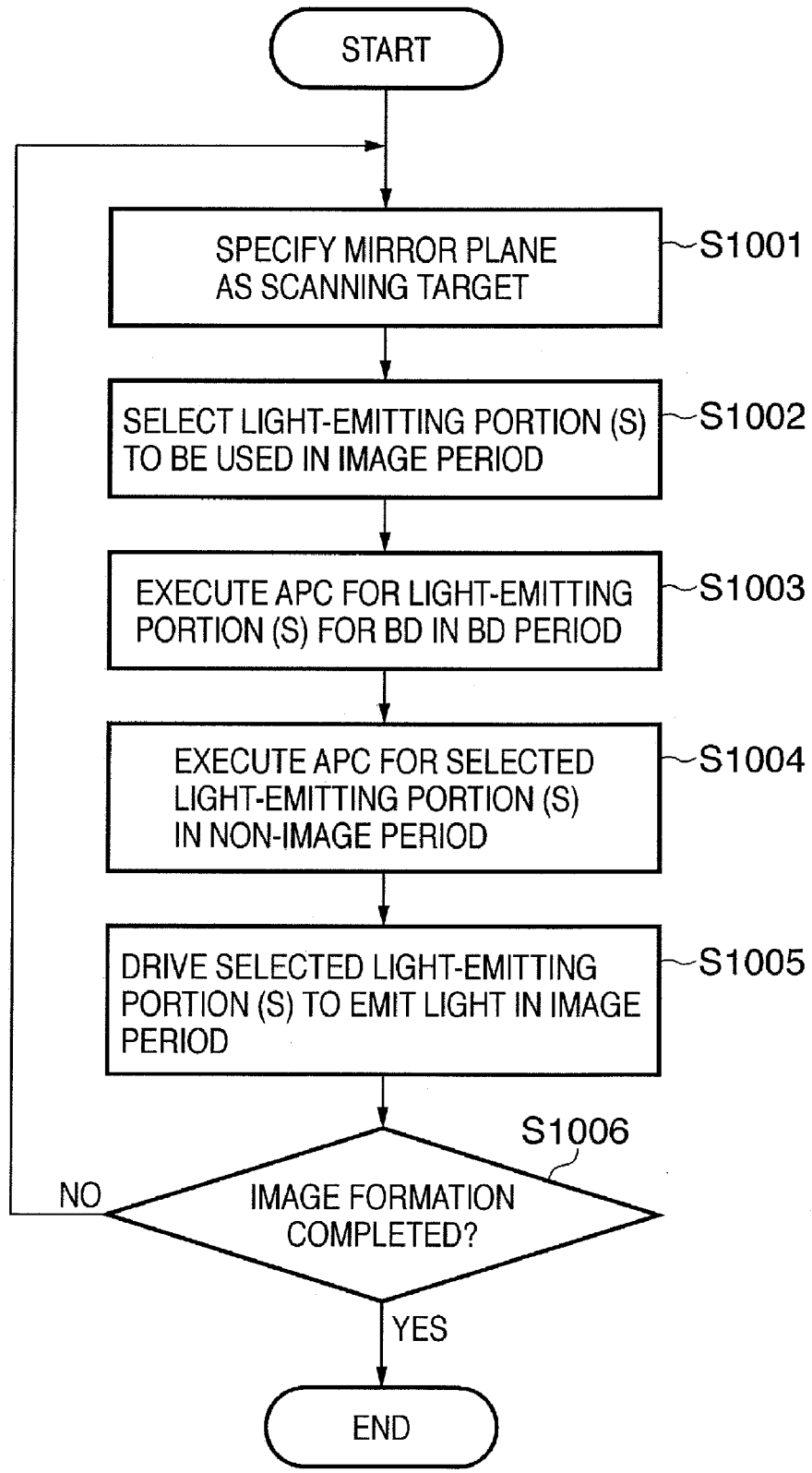
FIG. 10 is a flowchart which illustrates an example of an auto light power control method according to the embodiments.

FIG. 10 is a flowchart which illustrates an example of an auto light power control method according to this embodiment. In step S1001, the selection unit 602 specifies a mirror plane as the scanning target using a plane identification signal that is output from the mirror plane specifying unit 603.

In step S1002, the selection unit 602 selects one or more light-emitting portions that are suitable for scanning the specified mirror plane. Naturally, the light-emitting portions are selected on the premise that they will be used in an image period.

In step S1003, the selection unit 602 outputs a selection signal for causing a light-emitting portion for BD (for example, LD1) to light up in a BD period to the laser drive unit 201. The laser drive unit 201 drives the light-emitting portion for BD (for example, LD1) in the BD period to emit a beam. The APC unit 604 executes APC for the light-emitting portion for BD in the BD period.

In step S1004, the selection unit 602 outputs selection signals for light-emitting portions to be used in the image period to the laser drive unit 201. The laser drive unit 201 drives the selected light-emitting portions to emit beams in a non-image period positioned immediately before the image period. The APC unit 604 executes APC for each light-emitting portion that emits a light in the non-image period.

In step S1005, the selection unit 602 outputs selection signals for light-emitting portions to be used in the image period to the laser drive unit 201. The laser drive unit 201 drives the selected light-emitting portions to emit beams in the image period.

In step S1006, the main body controller 220 determines whether or not image formation is completed. When all images have been formed, it ends the present processing. When the processing is not to be ended, the operation returns to step S1001 to execute scanning for the next mirror plane.

According to the present embodiment, in one non-image period, auto light power control is executed only for light-emitting portions to be used in the next image period. As a result, the number of light-emitting portions for which auto light power control is executed in a non-image period can be reduced. More specifically, it is possible to relatively extend the control time that can be used per light-emitting portion. It is thus possible to execute auto light power control relatively accurately. As a result, an image with a high degree of stability in regard to density can be provided.

Further, the influence of a plane tilt can be reduced by specifying a mirror plane on which to scan a beam, and selecting one or more light-emitting portions that are suitable for reducing the influence of a plane tilt of the specified mirror plane.

Furthermore, for one or more light-emitting portions scheduled for use in an image period, it is preferable to execute APC in the immediately preceding non-image period that belongs to the same scanning cycle with the image period in question. This is because it is preferable that there is as little a time difference as possible between the APC and the image formation, since the relation between drive current and light power varies from one second to the next.

Naturally, when a plurality of light-emitting portions are to be used in an image period the APC unit 604 executes auto light power control for the plurality of light-emitting portions in the above described non-image period. However, since APC cannot be executed for a plurality of light-emitting portions at the same time, the selection unit 602 outputs the selection signals of the light-emitting portions that are the control objects in sequential order. Thereby, APC can be executed for all light-emitting portions to be used in a single image period.

Second Embodiment

In the above described embodiment, a case was described in which, for one or more light-emitting portions to be used in an image period, auto light power control is executed in an immediately preceding non-image period in the scanning cycle to which the relevant image period belongs.

In general, a non-image period exists before and after an image period in a scanning cycle. Further, in some cases the length of these non-image periods is different. Therefore, executing APC using a longer non-image period can be expected to improve accuracy. However, when using a non-image period that is positioned after the image period, it is necessary to execute APC for light-emitting portions to be used in an image period of the subsequent scanning cycle.

Therefore, according to the present embodiment a method is described in which, for one or more light-emitting portions to be used in an image period belonging to a subsequent scanning cycle, auto light power control is executed in a non-image period that belongs to the preceding scanning cycle.

Figure 11:
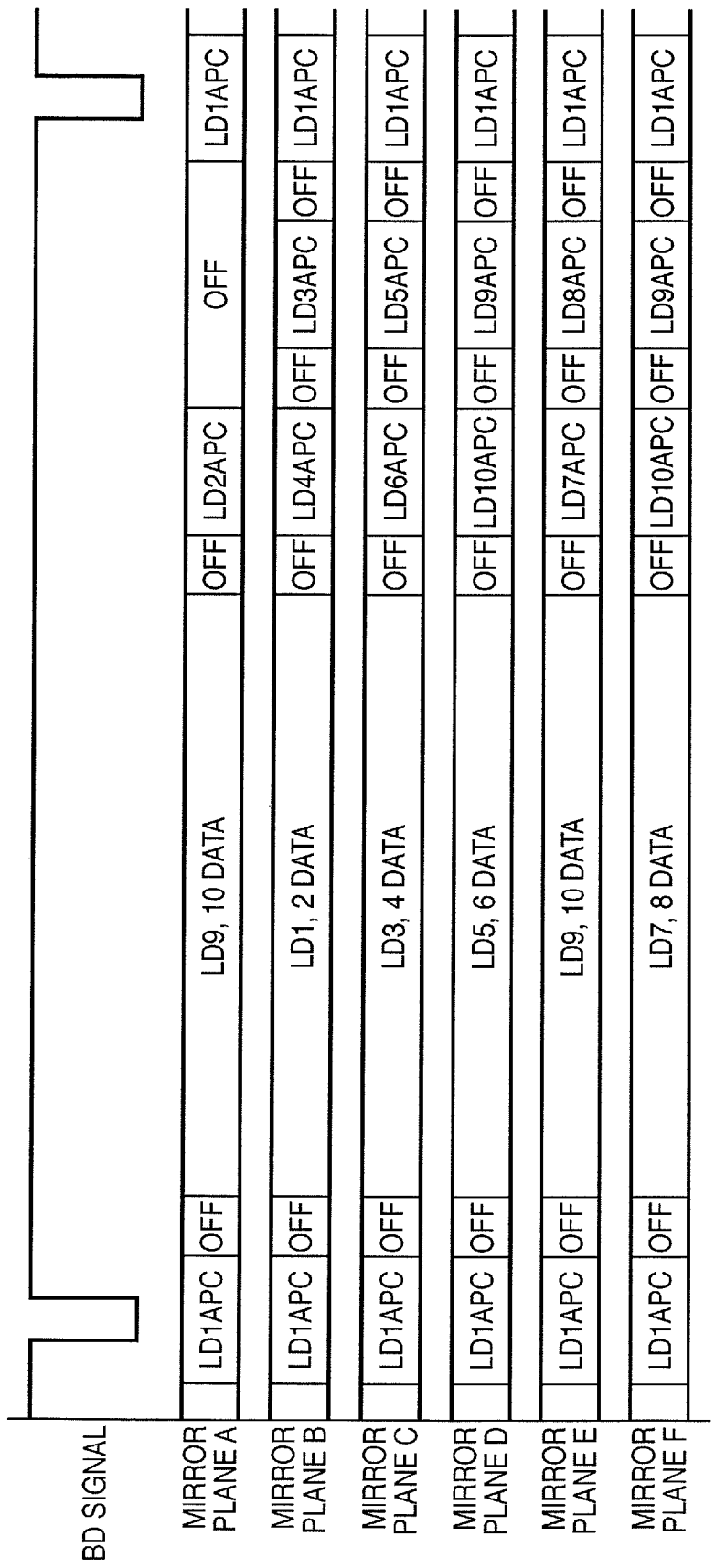
FIG. 11 is another exemplary APC timing chart according to the embodiments.

FIG. 11 is another exemplary APC timing chart according to the embodiments. In this case, a description is given that focuses on the mirror plane C. As will be understood from the figure, for the mirror plane C, the light-emitting portions LD3 and LD4 are used in the image period. Hence, APC is executed for the light-emitting portions LD3 and LD4 in a non-image period of the immediately preceding mirror plane B. APC is executed in a similar manner for the other mirror planes.

Figure 12:
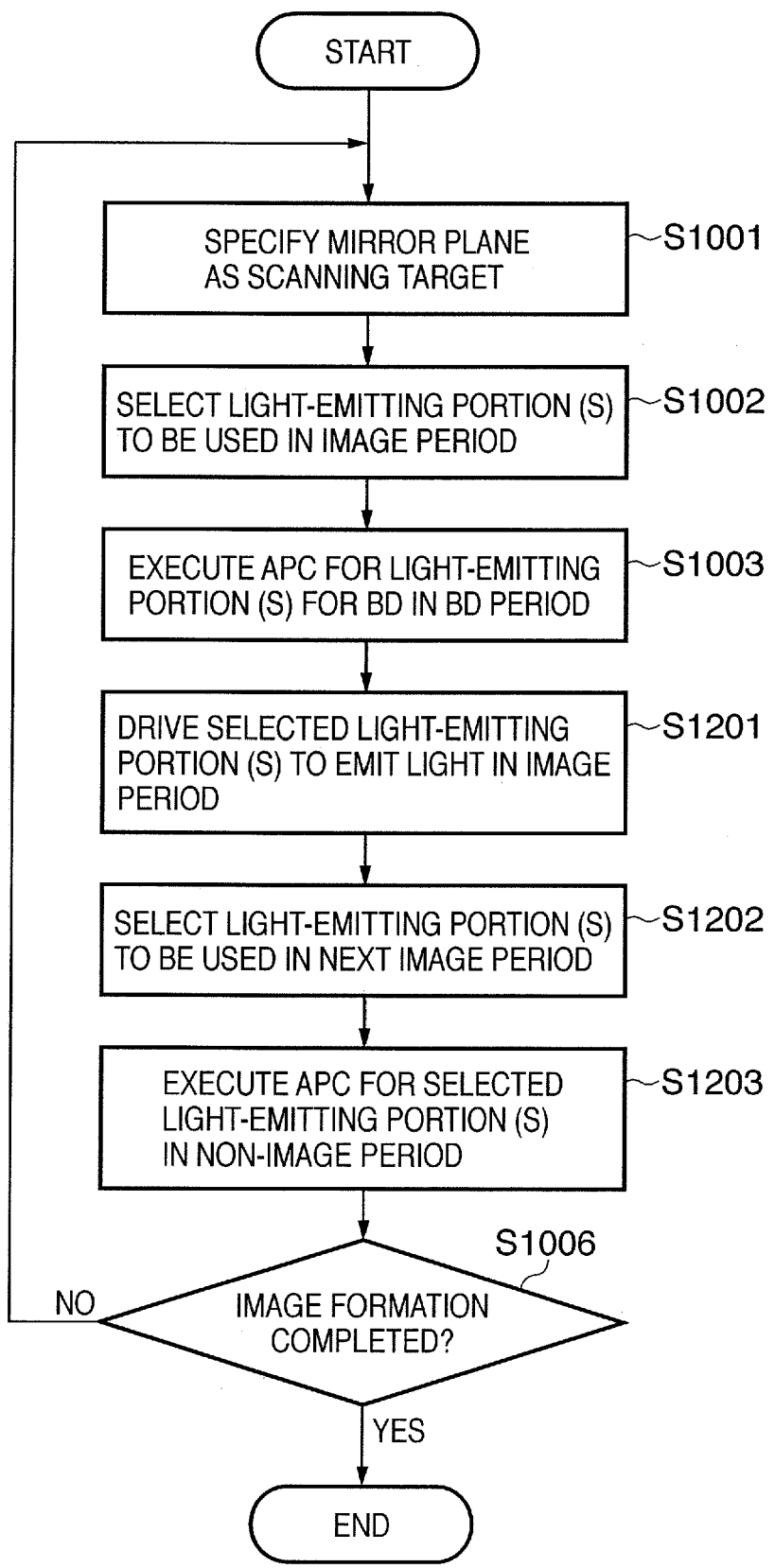
FIG. 12 is a flowchart which illustrates an example of another auto light power control method according to the embodiments.

FIG. 12 is a flowchart which illustrates an example of another auto light power control method according to the embodiments. Steps that were described already are denoted by the same reference numbers and a description thereof is omitted. Upon executing the above described steps S1001 to S1003, the operation proceeds to step S1201.

In step S1201, the selection unit 602 outputs selection signals for light-emitting portions to be used in the image period to the laser drive unit 201. The laser drive unit 201 drives the light-emitting portions that are selected for the image period to cause them to emit beams.

In step S1202, the selection unit 602 selects light-emitting portions to be used in the image period belonging to the next scanning cycle. For example, the selection unit 602 specifies a mirror plane to be used following the current mirror plane from a table stored in the memory, and also selects light-emitting portions to be used for the next mirror plane. Information regarding the order in which the mirror planes are aligned is also stored in the table.

In step S1203, the selection unit 602 outputs the selection signals of the selected light-emitting portions to the laser drive unit 201. The laser drive unit 201 drives the selected light-emitting portions to cause them to emit beams in a non-image period. In a non-image period, the APC unit 604 executes APC for each light-emitting portion that emits light. Thereafter, the operation proceeds to step S1006.

According to the present embodiment, for one or more light-emitting portions to be used in an image period belonging to the following scanning cycle, auto light power control is executed in a non-image period belonging to the preceding scanning cycle. For example, in a single scanning cycle, when the number of non-image periods positioned after the image period is greater than the number of non-image periods positioned before the image period (FIG. 11), APC is executed in non-image periods positioned after the image period. As a result, since a longer control time for executing APC can be secured, it is possible to relatively enhance the APC accuracy.

Third Embodiment

According to the present embodiment, a method is described which skips APC in a non-image period for light-emitting portions for which APC is executed in a BD period.

Figure 13:
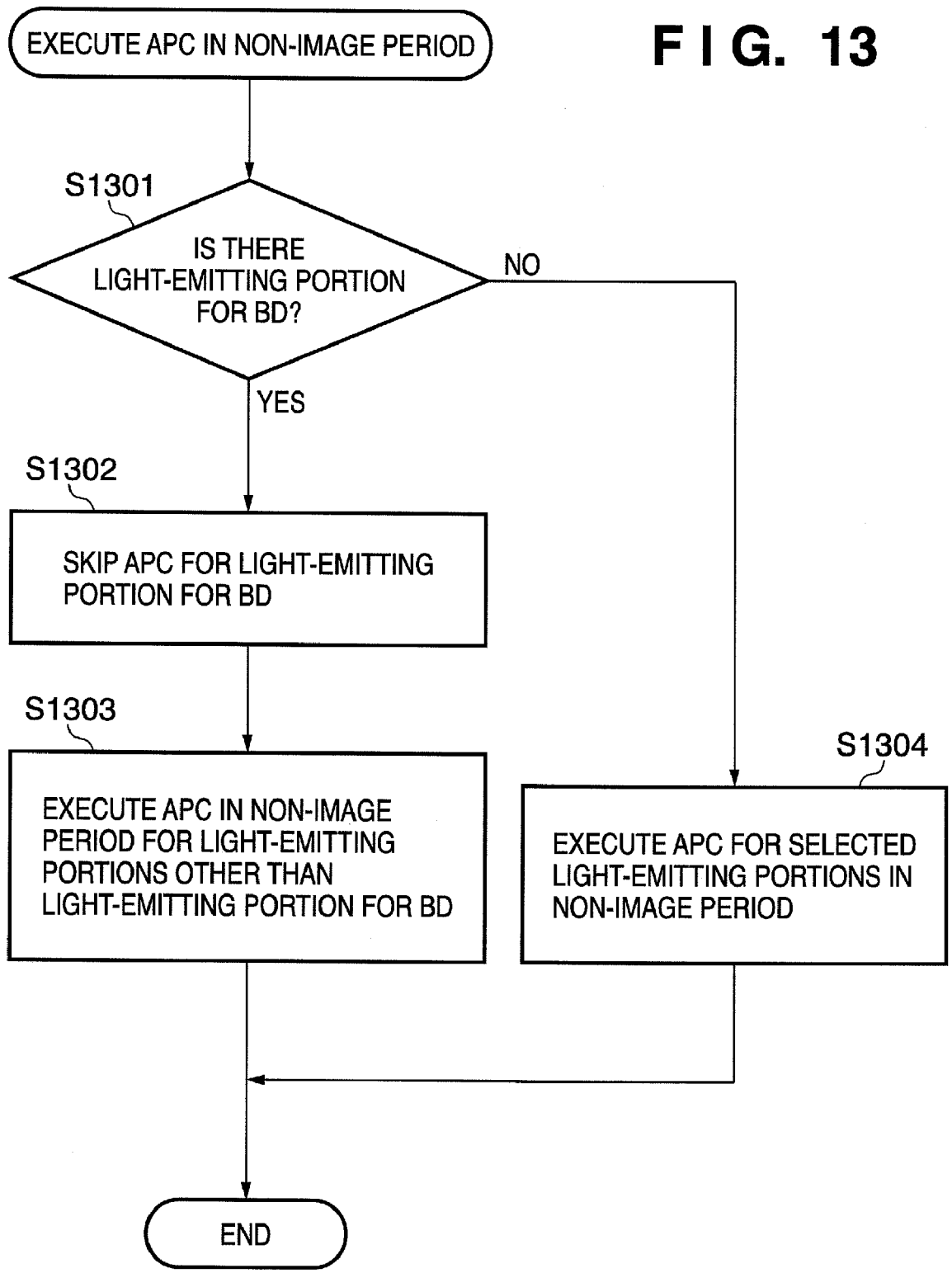
FIG. 13 is a flowchart which illustrates APC in a non-image period according to the embodiments.

FIG. 13 is a flowchart which illustrates APC in a non-image period according to this embodiment. This flowchart is one in which the above described step S1004 or S1203 is made into a subroutine.

In step S1301, the selection unit 602 determines whether or not a light-emitting portion for BD is included in the light-emitting portions to be used in the image period. If a light-emitting portion for BD is included, the operation proceeds to step S1302 in which, in order to skip the APC for the light-emitting portion for BD, the selection unit 602 deletes the selection signal of the light-emitting portion for BD from the list of selection signals of light-emitting portions to be used in a non-image period.

In step S1303, the selection unit 602 outputs to the laser drive unit 201 the selection signals for the remaining light-emitting portions, excluding the light-emitting portion for BD, among the selected light-emitting portions. The APC unit 604 executes APC for the remaining light-emitting portions.

In contrast, when a light-emitting portion for BD is not included, the operation proceeds to step S1304 to execute the APC as was described in relation to step S1004 or S1203.

According to the present embodiment, for a specific light-emitting portion (for example, LD1) to be used in a detection period (BD period) of the image formation timing, APC is executed in the BD period and the APC in a non-image period is skipped. It is thereby possible to extend the life of the light-emitting portion for BD. Further, since only the necessary minimum number of light-emitting portions are driven in a non-image period, the power consumption is also reduced.

Fourth Embodiment

In some cases, depending on the amount of plane tilt of each mirror plane, there may be a light-emitting portion that is not used for image formation. In this case, the light-emitting portion that is not used for image formation constitutes a waste. In contrast, when a light-emitting portion for BD is also used for image formation, the use frequency of the light-emitting portion for BD will be higher than the other light-emitting portions and the life of the light-emitting portion for BD is liable to expire relatively early. In the semiconductor laser 202 that has a plurality of light-emitting portions, if the life of even a single light-emitting portion expires, the semiconductor laser 202 must be exchanged.

Therefore, according to the present embodiment, by using as a light-emitting portion for BD a light-emitting portion whose use frequency is relatively low, it is possible to extend the exchange cycle of the semiconductor laser. In particular, the present embodiment is useful for a case in which light-emitting portions to be used with respect to each mirror plane change dynamically.

Figure 14:
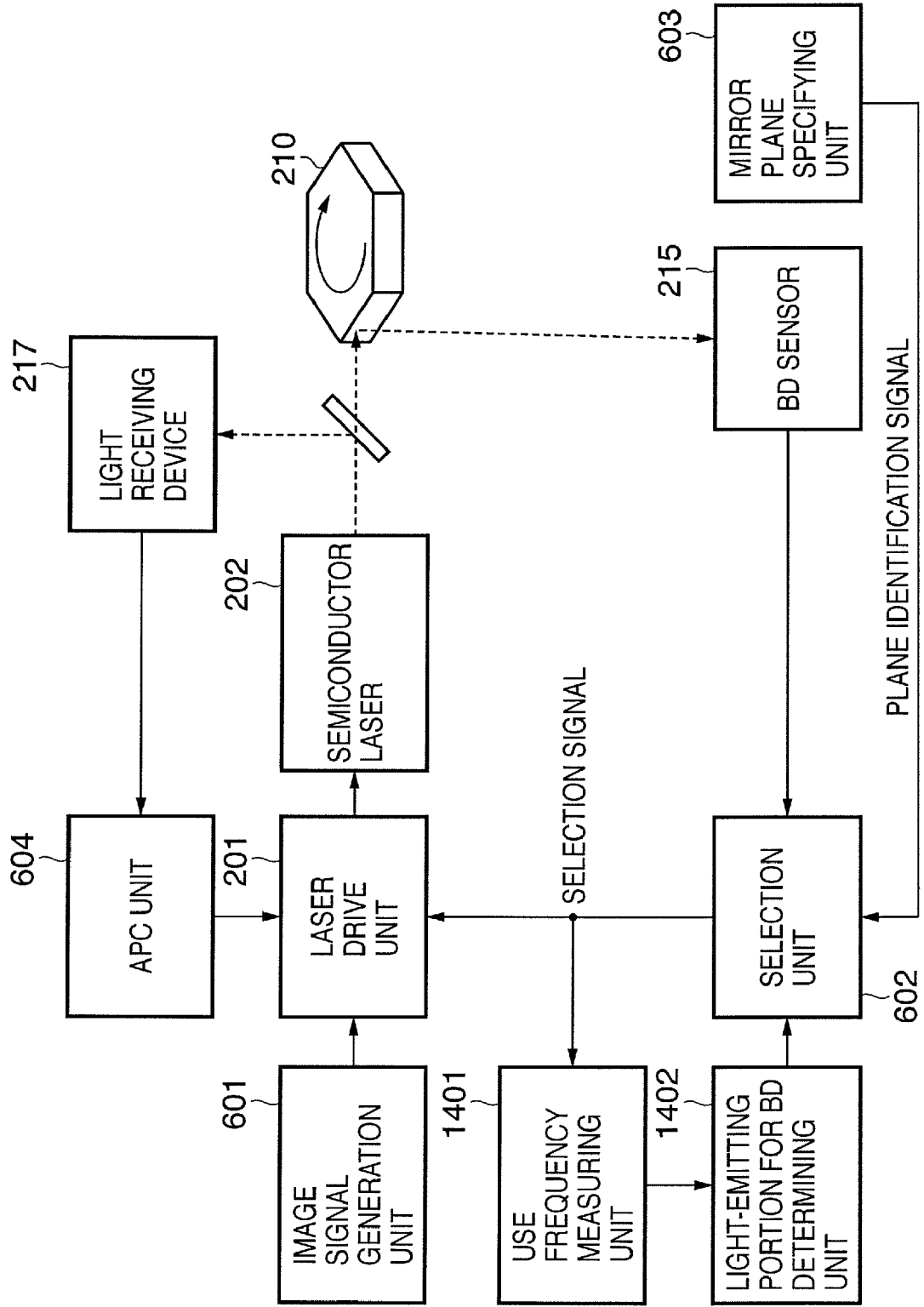
FIG. 14 is a view for describing another control mechanism according to the embodiments.

FIG. 14 is a view for describing another control mechanism according to this embodiment. Parts that were described already are denoted by the same reference numbers and a description thereof is omitted.

A use frequency measuring unit 1401 measures the use frequency of each light-emitting portion. For example, the use frequency measuring unit 1401 identifies selection signals that are output from the selection unit 602 and counts the number of times each selection signal is output.

A light-emitting portion for BD determining unit 1402 compares the use frequency of each light-emitting portion to determine the light-emitting portion with the lowest use frequency. The selection signal of the thus-determined light-emitting portion is notified to the selection unit 602. When the scanning cycle enters a BD period, the selection unit 602 outputs the selection signal of the light-emitting portion that is determined.

Figure 15:
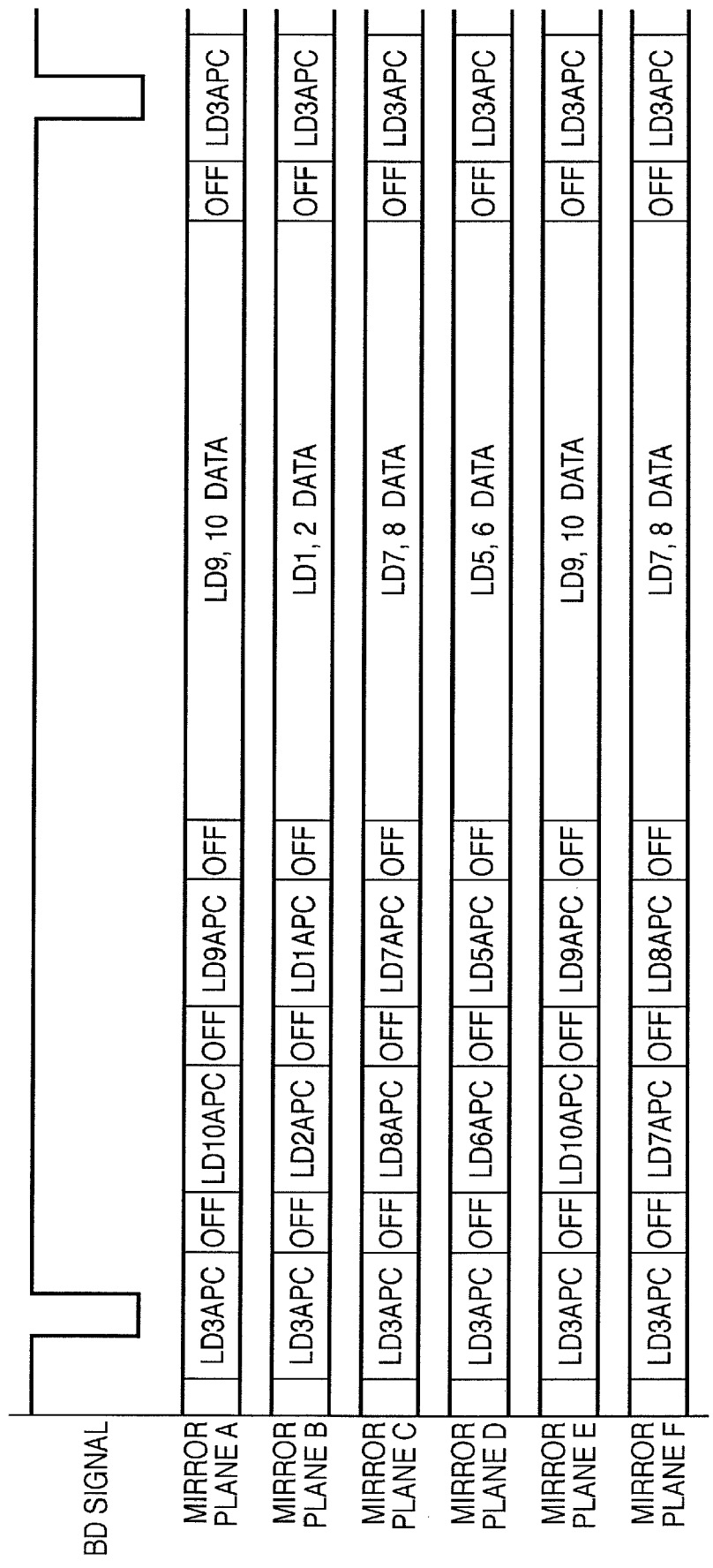
FIG. 15 is another exemplary APC timing chart according to the embodiments.

FIG. 15 is another exemplary APC timing chart according to this embodiment. According to this example, the light-emitting portions LD3 and LD4 among the light-emitting portions LD1 to LD10 are not used for image formation due to the relation with respect to the amount of plane tilt. More specifically, the use frequency of the light-emitting portions LD3 and LD4 becomes a relatively low value. Therefore the light-emitting portion LD3 is used in a BD period. Naturally the light-emitting portion LD4 may also be used in a BD period.

Thus, according to the present embodiment, by using a light-emitting portion with a low use frequency in a BD period, it is possible to extend the life of the semiconductor laser.

Figure 16:
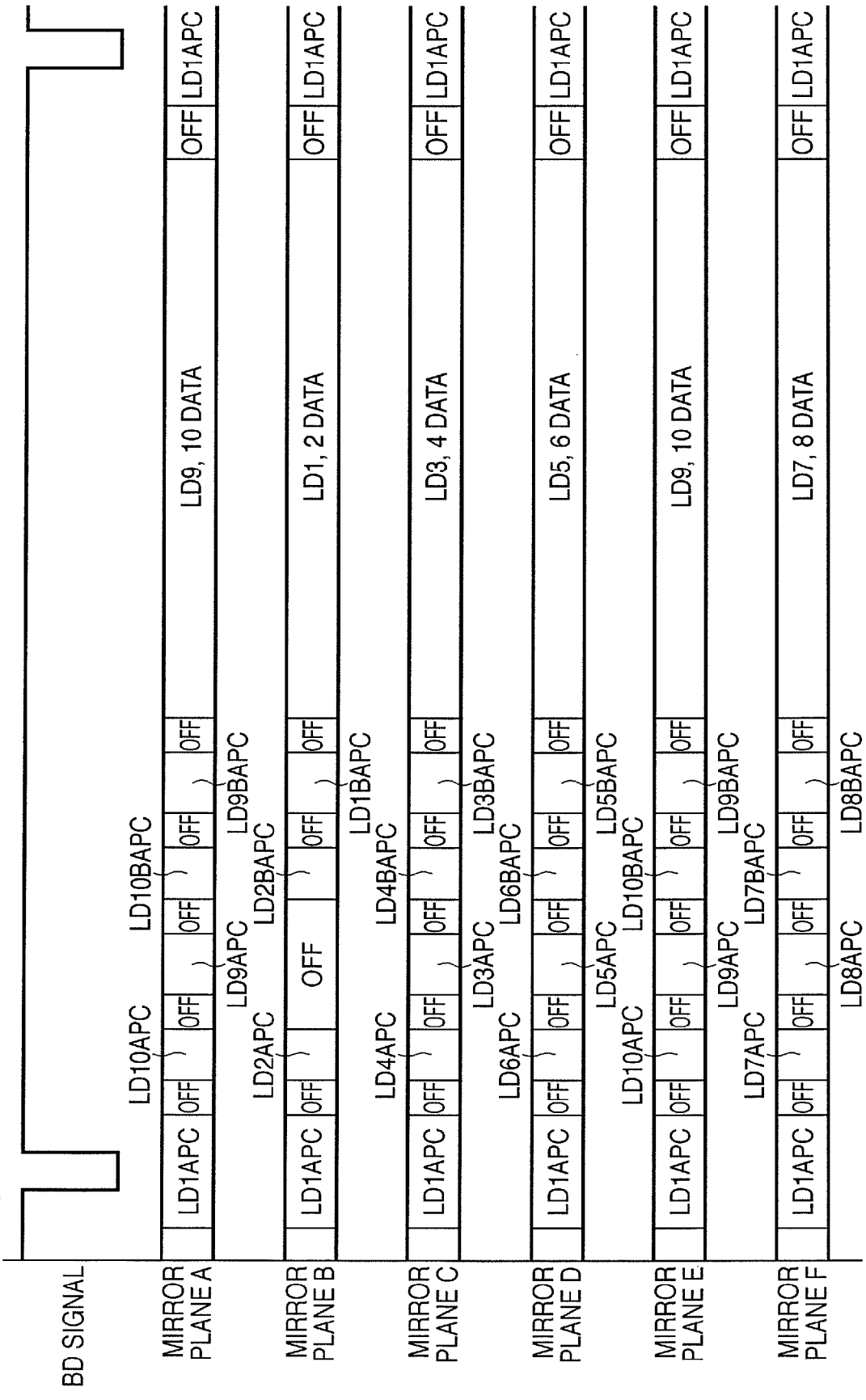
FIG. 16 is another exemplary APC timing chart according to the embodiments.

FIG. 16 is another exemplary APC timing chart according to this embodiment. This example illustrates an APC timing chart for a case in which APC for light power adjustment and APC for adjusting the bias current are performed.

Reference numerals LD1APC to LD10APC in FIG. 16 denote APC periods in which APC for adjusting the light power of LD1 to LD10, respectively, is executed. Further, reference numerals LD1BAPC to LD10BAPC denote APC (BAPC) periods for adjusting the bias current of LD1 to LD10, respectively. In FIG. 16, the terms "OFF" and "LD1, 2 DATA" and the like have the same meaning as in the above described embodiments.

In order to alleviate the influence of a plane tilt, light-emitting portions LD9 and LD10 are used for the mirror plane A. The lighting speed of the light-emitting portions LD9 and LD10 that are used for image formation directly influences the quality level of the image. Therefore, these light-emitting portions must be precisely adjusted to a predetermined bias current. Further, the relation between drive current and light power that is adjusted by bias APC varies over time due to the influence of heat and the like. It is therefore preferable for bias current adjustment of each light-emitting portion to be performed directly prior to image formation. More specifically, when forming an image using the mirror plane A, bias APC and light power APC for the light-emitting portions LD9 and LD10 are executed in the immediately preceding non-image period.

According to the present invention, it is possible to accurately execute auto light power control by reducing the number of light-emitting portions for which auto light power control is executed in a non-image period. It is thus possible to supply an image that has high stability with respect to density.

While the present invention has been described with reference to exemplary embodiments, it is to be understood that the invention is not limited to the disclosed exemplary embodiments. The scope of the following claims is to be accorded the broadcast interpretation so as to encompass all such modifications and equivalent structures and functions.

This application claims the benefit of Japanese Patent Application No. 2006-110104 filed on Apr. 12, 2006, which is hereby incorporated by reference herein in its entirety.

What is claimed is:

1. An image forming apparatus, comprising:
    a light source having a plurality of light-emitting portions;
    a rotating polygonal mirror which scans a beam that is emitted from the light source;
    a photosensitive member which is exposed by the beam in one scanning cycle of the beam, the one scanning cycle comprising an image period during which exposure of the photosensitive member is performed based on image data and a non-image period during which the exposure of the photosensitive member is not performed by the beam even though the beam is emitted from the light source;
    a selection unit which selects a light-emitting portion from among the plurality of light-emitting portions, the selected light-emitting portion being used to emit the beam during the image period;
    a detection unit which detects a light power of the beam emitted from any of the plurality of light-emitting portions; and
    a control unit which makes the selected light-emitting portion emit the beam during the non-image period and executes auto light power control for the selected light-emitting portion in accordance with the detection result of the beam obtained by the detection unit,
    wherein the control unit does not execute the auto light power control for at least one of non-selected light-emitting portions from among the plurality of light-emitting portions.

2. The image forming apparatus according to claim 1, further comprising a specifying unit which specifies a mirror plane from among a plurality of mirror planes provided with the rotational polygonal mirror on which the beam is incoming,
    wherein said selection unit is configured to select at least one of said plurality of light-emitting portions in accordance with a plane tilt that indicates amount of inclination for the mirror plane against the rotational axis of the rotating polygonal mirror.

3. The image forming apparatus according to claim 1, wherein said control unit is configured to execute the auto light power control for the selected-light-emitting portion to be used in the image period, in an immediately-preceding non-image period, the image period and the immediately-preceding non-image period belonging to the same scanning cycle.

4. The image forming apparatus according to claim 1, wherein said control unit is configured to execute the auto light power control for the selected light-emitting portion to be used in an image period belonging to a following scanning cycle, in a non-image period belonging to a current scanning cycle preceding to the following scanning cycle.

5. The image forming apparatus according to claim 1, further comprising:
    a measurement unit which measures a use frequency of each of said plurality of light-emitting portions; and
    a determining unit which determines a light-emitting portion for which the use frequency is lowest among said plurality of light-emitting portions;
    wherein, said selection unit is configured to select the light-emitting portion for which the use frequency is lowest as the specific light-emitting portion.

6. The image forming apparatus according to claim 1 said control unit comprising:
    a first auto light power control unit which sets a light power of a beam that is emitted from the selected one of said plurality of light-emitting portions to a target light power; and
    a second auto light power control unit which determines a bias current for the selected one of said plurality of light-emitting portions.

7. An auto light power control method of an image forming apparatus including a light source having a plurality of light-emitting portions, a rotating polygonal mirror that deflects a beam that is emitted from the light source and has a plurality of mirror planes, and a photosensitive member which is exposed by the beam in an image period which is included in one scanning cycle of the beam the one scanning cycle comprising the image period during which exposure of the photosensitive member is performed based on an inputted image data and a non-image period during which the exposure of the photosensitive member is not performed, the method comprising:
    a step of selecting a light-emitting portion from among the plurality of light-emitting portions, the selected light-emitting portion being used to emit the beam during the image period;
    a step of detecting a light power of the beam emitted from any of the plurality of light-emitting portions; and
    a step of making the selected light-emitting portion emit the beam during the non-image period and executing auto light power control for the selected light-emitting portion in accordance with the detection result of the beam obtained by the detection step,
    wherein the step of making and executing does not execute the auto light power control for at least one of non-selected light-emitting portions from among the plurality of light-emitting portions.

8. An optical scanning apparatus, comprising:
    a light source having a plurality of light-emitting portions;
    a rotating polygonal mirror that deflects a beam that is emitted from the light source to expose a photosensitive member in an image period that is included in one scanning cycle of the beam, the one scanning cycle comprising the image period during which exposure of the photosensitive member is performed based on an inputted image data and a non-image period during which the exposure of the photosensitive member is not performed the rotating polygonal mirror having a plurality of mirror planes;

a selection unit which selects a light-emitting portion from among the plurality of light-emitting portions, the selected light-emitting portion being used to emit the beam during the image period;

a detection unit which detects a light power of the beam emitted from any of the plurality of light-emitting portions; and a control unit which makes the selected light-emitting portion emit the beam during the non-image period and executes the auto light power control for the selected light-emitting portion in accordance with the detection result of the beam obtained by the detection unit, wherein the control unit does not execute the auto light power control for at least one of non-selected light-emitting portions from among the plurality of light-emitting portions.

* * * * *